3,252,862
DERIVATIVES OF 1,2,4-BENZOTHIADIAZINE AND PROCESS FOR THEIR MANUFACTURE
Walter Siedel, Bad Soden, Taunus, and Karl Sturm and Helmut Nahm, Frankfurt am Main, Germany, assignors to Farbwerke Hoechst Aktiengesellschaft vormals Meister Lucius & Bruning, Frankfurt am Main, Germany, a corporation of Germany
No Drawing. Filed Jan. 23, 1962, Ser. No. 168,260
Claims priority, application Germany, Jan. 28, 1961, F 33,088
10 Claims. (Cl. 167—65)

The present invention relates to new derivatives of 1,2,4-benzothiadiazine characterized by saluretic and diuretic properties and capable of being used as remedies in cases of edemae and essential hypertonia. The invention likewise relates to pharmaceutical preparations showing saluretic and diuretic activity and containing the above-mentioned substances as active ingredients.

It is already known that 6-chloro-7-sulfamyl-3,4-dihydro-1,2,4-benzothiadiazine-1,1-dioxide and other compounds of this type containing one or several substituents possess diuretic and saluretic activity. A disadvantage of these compounds, however, consists in that they cause, in addition to the desired secretion of sodium chloride, likewise an increased diuresis of potassium. In order to prevent threatening hypopotassemia in the case of prolonged application of the substances a potassium substitution therapy becomes absolutely necessary which may consist in administering potassium chloride or fruit juices; in many cases it being advisable to hospitalize the patient for observation.

Now we have found that quite a number of new derivatives of 6 - azido - 7 - sulfamyl - 3,4 - dihydro - 1,2,4-benzothiadiazine-1,1-dioxide and their salts with physiologically tolerated bases show an excellent diuretic and saluretic activity and are superior to the above-mentioned known compounds due to their causing a remarkably low excretion of potassium and a relatively high excretion of chlorine ions.

The present invention likewise relates to a process for the manufacture of 1,2,4-benzothiadiazine derivatives of the general Formula I

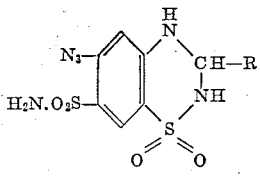

in which R represents hydrogen, an alkyl group having from 1–7 carbon atoms which may be substituted by halogen atoms, a cycloalkyl or cycloalkylalkyl group having at most 8 carbon atoms, or a phenyl and phenylalkyl group having at most 8 carbon atoms which may be substituted by halogen atoms, wherein 5-halogene-2,4-disulfamylanilines are reacted with hydrazine at a temperature above 100° C., wherein the 5-hydrazino-2,4-disulfamylaniline thus obtained is diazotized with nitrous acid, and wherein the 5-azido-2,4-disulfamylaniline is condensed with an aldehyde of the general formula R—CHO, in which R has the meanings given above in the presence of a condensing catalyst, and wherein, if desired, the 6-azido - 7 - sulfamyl - 3,4 - dihydro - 1,2,4 - benzothiadiazine-1,1-dioxides thus formed are neutralized with a physiologically tolerated inorganic or organic base.

As substituents R in the compounds of the Formula I, for instance the following residues are to be mentioned: alkyl groups such as methyl, ethyl, n-propyl, isopropyl, n-butyl, isobutyl, 2-methyl-butyl, 3-methyl-butyl, 1,3-dimethyl-butyl anl isoheptyl. The above-mentioned alkyl groups may likewise be substituted by halogen atoms, for instance chloromethyl or bromomethyl may be used. Furthermore, there can be applied as substituents R cycloalkyl groups such as cyclohexyl and cycloalkylalkyl groups, for instance, cyclohexylmethyl, cyclopentylmethyl. There may likewise be mentioned: phenyl radicals substituted by halogen atoms or phenylalkyl radicals having up to 8 carbon atoms, the substituents of which may be in any desired position of the benzene nucleus, for instance, phenyl, o-, m- or p-chlorophenyl, or o-, m- or p-bromophenyl, benzyl and the isomeric chlorobenzyls. When using residues having more than 8 carbon atoms the activity of the compounds is, in general, considerably diminished. 5-halogeno-2,4-disulfamylanilines are accessible, for instance, by applying the process disclosed in Belgian Patent 596,826.

The exchange of the halogen atom for the hydarzine group in the first phase of the reaction is suitably carried out at temperatures between 100 and 140° C. It is of advantage to operate in an inert solvent miscible with water, such as ethylene-glycolmonomethyl ether and to use hydrazine hydrate in a concentration of 80% in an excess of 2 to 3 mols. It is, however, likewise possible to use an equimolar amount of hydrazine and a tertiary organic base (triethylamine, diethylaniline) or an inorganic base (sodium hydroxide, sodium carbonate) as acid binding agent. The isolation is favorably carried out by pouring the reaction solution into water and adjusting the mixture to a pH-value of about 7, whereby the 5-hydrazino-2,4-disulfamylaniline separates in the form of crystals.

The following conversion of this compound to 5-azido-2,4-disulfamylaniline in the second phase is carried out advantageously at temperatures between −5 and +10° C., preferably at 0° C. in aqueous solution, one equivalent of a mineral acid at most being used. It is of advantage to dissovle the hydrazine compound in the equimolar amount of 0.1 to 0.5 N-hydrochloric acid and to pour this solution at 0° C. into the equimolar amount of aqueous sodium nitrite solution while intensely stirring. While proceeding in that way the desired 5-azido-2,4-disulfamylaniline separates in crystalline form. The yield amounts to about 80% of the theory and the product thus obtained is pure enough in order to be subjected directly to a further treatment.

This very result of the reaction is surprising since the molecule of the 5-hydrazino-2,4-disulfamylaniline still contains a further diabotizable amino-group. It is, therefore, of importance strictly to maintain the reaction conditions mentioned above. In contradistinction thereto, the water-soluble diazonium salt of 5-hydrazino-2,4-disulfamyl-aniline is formed exclusively if one equivalent of nitrite solution in a three-molar excess of aqueous mineral acid is caused to flow into the solution of the hydrazine compound. 5-azido-2,4-disulfamyl-aniline is condensed in the 3rd reaction phase with an aldehyde of the general formula R—CHO, wherein R has the meaning given above. This ring closure reaction is suitably effected at temperatures between 20 and 100° C. and, generally, requires an acid catalyst, for instance, hydrochloric acid, sulfuric acid, phosphoric acid or acetic acid. Only when formaldehyde is used, basic catalysts, such as sodium hydroxide or potassium carbonate, may likewise be applied. The aldehydes may be used as such or likewise in the form of their functional derivatives, for instance, as acetals or in polymeric form. For the condensation with 5-azido-2,4-disulfamyl-aniline the following compounds may be used, for instance, Formaldehyde,
Paraformaldehyde,
Methylal,
Trihydroxy-methylene,
Acetaldehyde,
Acetaldehyde-diethylacetal,
Paraldehyde,
Chloracetaldehyde-diethylacetal,
Bromacetaldehyde-diethylacetal,
Propionaldehyde,
n-Butyraldehyde,
Isobutyraldehyde,
3-methyl-butanal-(1),
2-methyl-butanal-(1),
2-methyl-pentanal-(1),
2,4-dimethyl-pentanal-(1),
Hexahydrobenzaldehyde,
Phenylacetaldehyde,
Cyclopentylacetaldehyde,
Cyclohexylacetaldehyde,
4-chlorophenylacetaldehyde,
1-phenyl-propionaldehyde,
Benzaldehyde and
4-chloro-benzaldehyde.

The condensation is favorably carried out in the presence of a suitable inert solvent, for instance, with the use of aliphatic alcohols of low molecular weight (ethanol), ethers miscible with water (ethyleneglycol-monomethyl ether, diethyleneglycol-dimethyl ether, dioxane) or of mixtures of these solvents with water. A mixture of ethanol and 5 N-aqueous hydrochloric acid in a ratio of 1:1 has proved to be of special advantage.

The reaction period depends upon the reaction temperature chosen and on the aldehyde component. When applying, for instance, a temperature of 80–90° C., the formaldehyde reacts within 1 hour.

The molar ratio of the azido compound to aldehyde is advantageously chosen between 1:1 and 1:1.2. When using a larger excess of aldehyde, in particular of formaldehyde and its polymers or acetals, side reactions are to be expected (reaction with the second sulfonamide group). When using acid catalysts and aqueous solvents, the reaction products often crystallize on cooling of the reaction mixture. Otherwise, a part of the solvent is evaporated, the remaining part of the mixture is acidified and the reaction product is then precipitated with water. In order to purify the product, it is recrystallized from water, ethanol/water or dimethylformamide/water.

The compounds thus obtained can be converted into the corresponding salts with the aid of physiologically tolerated inorganic or organic bases. As inorganic bases there can be used, for instance, sodium- and potassium hydroxide, alkali metal carbonates or alkali metal bicarbonates, calcium- or magnesium oxide. As organic bases there are mentioned, for instance, diethylaminoethanol and glucosamine.

The products of the invention are novel compounds showing an excellent diuretic and saluretic activity and capable of being applied orally or parenterally. Since they are well tolerated, they are suitable, for instance, for the therapy of edemae and, in combination with other compounds showing hypotensive activity, for the permanent therapy of essential hypertonia. The therapeutic doses in humans are within 5 and 50 milligrams.

In the following table the data of saluresis of 6-azido-7-sulfamyl-3,4-dihydro-1,2,4-benzothiadiazine - 1,1 - dioxide are compared with the corresponding pharmacological data of the known 6-chloro-7-sulfamyl-3,4-dihydro-1,2,4-benzothiadiazine-1,1-dioxide:

| Compound | Dose, mg./kg. mols/kg. | Na+, milli-mols/kg. | K+, milli-mols/kg. | Cl-, milli-mols/kg. | $\frac{Na^+}{K^+}$ | $\frac{Cl^-}{Na^++K^+}$ |
|---|---|---|---|---|---|---|
| 6-azido-7-sulfamyl-3,4-dihydro-1,2,4-benzothiadiazine-1,1-dioxide | 50 | 2.19 | 0.55 | 2.53 | 4.0 | 0.93 |
| 6-chloro-7-sulfamyl-3,4-dihydro-1,2,4-benzothiadiazine-1,1-dioxide | 50 | 2.10 | 1.10 | 2.67 | 1.9 | 0.83 |

The following indications serve to elucidate the table: As test animals there were used rates of about 100 grams of body weight. The animals were deprived of food for 24 hours prior to the beginning of the tests. They were divided into groups of 3 animals each, placed on diurese funnels and given the preparation to be tested in the form of a suspension in 0.5 cc. of starch solution by means of an esophagel sound. In the urine excreted within the following five hours the concentration of potassium and sodium ions was determined flame-photometrically and the concentration of chlorine ions argentometrically, and from these values the total excretion of these electrolytes during the five hours' test was calculated in millimols/kilogram. The values indicated in the table are the average values of 2 groups each of test animals. The superiority of the new compound is clearly expressed, above all, by the coefficients $$\frac{Na^+}{K^+}$$

and $$\frac{Cl^-}{Na^++K^+}$$

As already mentioned above, the first one should be as high as possible, whereas the second quotient should be of a value as near as possible to 1, i.e. as anions should be excreted practically only chlorine ions but no bicarbonate ions.

The compounds may be used in free form as well as in the form of their salts, particularly their alkali metal salts, for oral and parenteral application, if desired, in admixture with appropriate solid or liquid pharmaceutical carrier substances such as water, vegetable oils, starch, lactose or talc, if required with adjuvants such as stabilizers, preserving agents and emulsifiers. The preparations are preferably used in the form of tablets, dragees, capsules and, for injection, solutions or suspensions.

The following examples serve to illustrate the invention but they are not intended to limit it thereto:

EXAMPLE 1

*6-azido-7-sulfamyl-3,4-dihydro-1,2,4-benzothiadiazine-1,1-dioxide*

(a) 286 grams of 5-chloro-2,4-disulfamylaniline (1 mol) and 200 cc. of hydrazine-hydrate of 80% concentration are heated under reflux in 600 cc. of ethyleneglycol-monomethyl ether for 5 hours. The mixture is then poured into 6 liters of water, and adjusted to pH 7 by means of hydrochloric acid. After cooling for several hours, the reaction product is precipitated in the form of crystals and filtered with suction. After washing with water and drying on the steam bath there are obtained 254 grams of 5-hydrazine-2,4-disulfamylaniline in the form of yellowish crystals (90% of the theory) decomposing between 208 and 210° C. After recrystallization from water or a mixture of ethanol and water the substance decomposes at 215° C.

(b) 141 grams of 5-hydrazino-2,4-disulfamylaniline (0.5 mol) are dissolved, while mildly heated, in the mixture of 500 cc. of 1 N-hydrochloric acid and 2 liters of water. The solution cooled to 0° C. is poured, while intensely stirred and cooled with ice, into 1.0 liter of a 0.5-molar aqueous sodium nitrite solution. The azide compound immediately separates in the form of crystals. It is still stirred for 10 minutes at room temperature, 0.5 liter of 1 N-hydrochloric acid is added, the mixture is filtered with suction and thoroughly washed with water. The weakly yellowish crude product is dried at 60° C. under reduced pressure. It decomposes between 194–196° C. while adopting a brown coloration and with evolution of gas. The 5-azido-2,4-disulfamylaniline is obtained in a yield of 126 grams (86% of the theory). The product can directly be used for the further reaction. From aqueous ethanol, with the use of active coal, the compound crystallizes in the form of small colorless needles decomposing at 202° C.

($c_1$) A mixture of 29.3 grams of 5-azido-2,4-disulfamylaniline (0.1 mol), 300 cc. of ethanol, 20 cc. of 1 N-sodium hydroxide solution and 12 cc. of aqueous formaldehyde solution of 30% strength is heated for 1 hour under reflux. After addition of 30 cc. of 1 N-hydrochloric acid the mixture is filtered, 500 cc. of water are added to the filtrate, it is concentrated to half of its volume and allowed to crystallize at room temperature. The crude product (26.0 grams) is recrystallized from aqueous methanol of 20% strength, with addition of active coal. There are obtained 16.1 grams (52% of the theory) of 6-azido - 7 - sulfamyl-3,4-dihydro-1,2,4-benzothiadiazine-1,1-dioxide decomposing at 200° C.

($c_2$) A mixture of 29.3 grams of 5-azido-2,4-disulfamylaniline (0.1 mol), 300 cc. of ethanol, 300 cc. of 5 N-hydrochloric acid and 3.3 grams of paraformaldehyde is heated for 1 hour under reflux. From the clear, yellow reaction solution the condensation product crystallizes out within 24 hours at room temperature. The crude product (20.8 grams) is recrystallized as described sub ($c_1$). There are obtained 14.7 grams (48% of the theory) of 6-azido-7 - sulfamyl-3,4-dihydro-1,2,4-benzothiadiazine-1,1-dioxide decomposing at 200° C.

Instead of 3.3 grams of paraformaldehyde there can likewise be used 3.3 grams of trihydroxy-methylene or 8.3 grams of methylal $CH_2(OCH_3)_2$.

EXAMPLE 2

*3-ethyl-6-azido-7-sulfamyl-3,4-dihydro-1,2,4-benzothiadiazine-1,1-dioxide*

29.3 grams of 5-azido-2,4-disulfamylaniline (0.1 mol) are heated with the mixture of 6.4 grams of propionaldehyde (0.11 mol), 350 cc. of ethanol and 350 cc. of 5 N-hydrochloric acid for 2 hours under reflux. After standing for several hours at room temperature the mixture is filtered with suction, washed with water and the 3-ethyl-6-azido-7-sulfamyl-3,4-dihydro - 1,2,4-benzothiadiazine-1,1-dioxide obtained is dried on the steam bath. The yield amounts to 27.7 grams (83% of the theory), the decomposition point to 210° C. After recrystallization from a mixture of dimethylformamide and water the decomposition point remains constant.

EXAMPLE 3

*3-(isobutyl)-6-azido-7-sulfamyl-3,4-dihydro-1,2,4-benzothiadiazine-1,1-dioxide*

The mixture of 29.3 grams of 5-azido-2,4-disulfamylaniline (0.1 mol), 9.5 grams of 3-methyl-butanal-(1) (0.11 mol), 350 cc. of ethanol and 350 cc. of 5 N-hydrochloric acid is heated for 1 hour under reflux; to the clear reaction solution there are then added 150 cc. of water and the mixture is allowed to crystallize within 24 hours at room temperature. The crude product (35 grams) is recrystallized from aqueous ethanol of 50% strength, while active coal is added. There are obtained 24.0 grams (66% of the theory) of 3-(isobutyl)-6-azido-7-sulfamyl-3,4-dihydro-1,2,4-benzothiadiazine-1,1-dioxide decomposing at 192° C.

EXAMPLE 4

*3-(1-methylbutyl)-6-azido-7-sulfamyl-3,4-dihydro-1,2,4-benzothiadiazine-1,1-dioxide*

According to the method described in Example 3 there is obtained by using 11 grams of 2-methyl-pentanol-(1) (0.11 mol) the 3-(1-methyl-butyl)-6-azido-7-sulfamyl-3,4-dihydro-1,2,4-benzothiadiazine-1,1-dioxide. The crude product (31 grams) is recrystallized from aqueous ethanol of 50% strength. The yield amounts to 21.0 grams (56% of the theory). Decomposition at 188° C.

EXAMPLE 5

*3-(cyclopentylmethyl)-6-azido-7-sulfamyl-3,4-dihydro-1,2,4-benzothiadiazine-1,1-dioxide*

According to the method described in Example 3 there is obtained the 3-(cyclopentylmethyl)-6-azido-7-sulfamyl-3,4-dihydro-1,2,4-benzothiadiazine-1,1-dioxide by using 12.4 grams of cyclopentylacetaldehyde (0.11 mol). The yield amounts to 20.5 grams (53% of the theory). Point of decompostion 190° C. (from aqueous ethanol).

EXAMPLE 6

*3-(cyclohexylmethyl)-6-azido-7-sulfamyl-3,4-dihydro-1,2,4-benzothiadiazine-1,1-dioxide*

According to the directions given in Example 3 there is obtained the 3-(cyclohexylmethyl)-6-azido-7-sulfamyl-3,4-dihydro-1,2,4-benzothiadiazine-1,1-dioxide by using 13.6 grams of cyclohexylacetaldehyde (0.11 mol). The crude product is recrystallized from aqueous ethanol of 50% strength. The yield amounts to 24 grams (59% of theory). Decomposition point 186° C.

EXAMPLE 7

*3-(p-chlorophenyl)-6-azido-7-sulfamyl-3,4-dihydro-1,2,4-benzothiadiazine-1,1-dioxide*

By using 15.5 grams of p-chlorobenzaldehyde (0.11 mol) there is obtained according to the method described in Example 3 the 3-(p-chlorophenyl)-6-azido-7-sulfamyl-3,4 - dihydro-1,2,4-benzothiadiazine-1,1-dioxide. The crude yield amounts to 36.2 grams (87% of the theory), the decomposition point to 201–204° C. After recrystallization from ethanol of 50% strength the substance decomposes at 208° C.

EXAMPLE 8

*3-benzyl-6-azido-7-sulfamyl-3,4-dihydro-1,2,4-benzothiadiazine-1,1-dioxide*

A mixture of 29.2 grams of 5-azido-2,4-disulfamylaniline (0.1 mol), 15.4 grams of phenylacetaldehyde (0.13 mol), 350 cc. of ethanol and 350 cc. of 5 N-hydrochloric acid is heated for 3 hours under reflux. The light-yellow reaction mixture is cooled to room temperature and, after 30 minutes, resinous by-products that have separated are eliminated by filtration. After standing for 3 days at 5° C. the condensation product crystallizes out of the filtrate. The yield amounts to 26.7 grams (68% of the theory) of 3-benzyl-6-azido-7-sulfamyl-3,4-dihydro-1,2,4-benzothiadiazine-1,1-dioxide. Point of decomposition 194° C.

EXAMPLE 9

*3-chloromethyl-6-azido-7-sulfamyl-3,4-dihydro-1,2,4-benzothiadiazine-1,1-dioxide*

According to the method indicated in Example 5 there is obtained the 3-chloromethyl-6-azido-7-sulfamyl-3,4- dihydro-1,2,4-benzothiadiazine-1,1-dioxide in a crude yield of 28.0 grams (79% of the theory) with the use of 18 cc. of chloracetaldehyde-diethylacetal (0.12 mol). Point of decomposition 183° C.

We claim:
1. Compounds selected from the group consisting of (1) benzothiadiazine derivatives of the formula

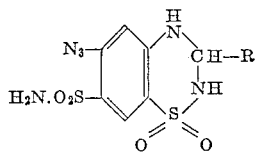

wherein R is a member selected from the group consisting of hydrogen, alkyl of one to seven carbon atoms, cyclopentylmethyl and cyclohexylmethyl, and (2) the salts of said compounds with physiologically tolerable bases.

2. 6 - azido-7-sulfamyl-3,4-dihydro-1,2,4-benzothiadiazine-1,1-dioxide.
3. 3 - isobutyl - 6 - azido-7-sulfamyl-3,4-dihydro-1,2,4-benzothiadiazine-1,1-dioxide.
4. 3 - (1'-methylbutyl)-6-azido-7-sulfamyl-3,4-dihydro-1,2,4-benzothiadiazine-1,1-dioxide.
5. 3 - (cyclopentylmethyl)-6-azido-7-sulfamyl - 3,4-dihydro-1,2,4-benzothiadiazine-1,1-dioxide.
6. 3 - (p-chlorophenyl)-6-azido-7-sulfamyl - 3,4-dihydro-1,2,4-benzothiadiazine-1,1-dioxide.
7. 3 - benzyl-6-azido-7-sulfamyl-3,4-dihydro-1,2,4-benzothiadiazine-1,1-dioxide.
8. In the process of preparing 1,2,4-benzothiadiazines of the formula

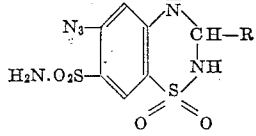

wherein R is a member selected from the group consisting of hydrogen, alkyl of one to seven carbon atoms, cyclopentylmethyl and cyclohexyl methyl, which comprises (1) reacting 5-halogeno-2,4-disulfamylaniline with hydrazine and (2) diazotizing 5-hydrazino-2,4-disulfamylaniline thus obtained with nitrous acid, and (3) condensing 5-azido-2,4-sulfamylaniline thus obtained with an aldehyde of the general formula R—CHO, in which R has the meanings given above, the step of diazotizing a solution of 5-hydrazino-2,4-disulfamylaniline in at most one equivalent of dilute mineral acid with one equivalent of a nitrite solution within a temperature range of —5 to +10° C., to form 5-azido-2,4-disulfamylaniline.

9. A pharmaceutical composition in dosage unit form containing from 5 to 50 milligrams of a compound selected from the group consisting of (1) benzothiadiazine derivatives of the formula

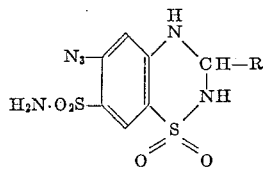

wherein R is a member selected from the group consisting of hydrogen, alkyl of one to seven carbon atoms, cyclopentylmethyl and cyclohexylmethyl, and (2) the salts of said compounds with physiologically tolerable bases, and a pharmaceutically acceptable carrier.

10. A pharmaceutical composition according to claim 9, wherein said pharmaceutically acceptable carrier is a member selected from the group consisting of water, vegetable oils, starch, lactose and talc.

References Cited by the Examiner

FOREIGN PATENTS 36,956   5/1959   Luxembourg _____ 260—234

OTHER REFERENCES

Close et al., J. Amer. Chem. Soc., volume 82, pages 1132–1138 (1960).

Novello et al., J. Org. Chem., volume 25, pages 970–980 (1960).

NICHOLAS S. RIZZO, *Primary Examiner.*